United States Patent
Loreto et al.

(10) Patent No.: US 12,190,046 B2
(45) Date of Patent: Jan. 7, 2025

(54) TEXT EDITING

(71) Applicant: Sony Group Corporation, Tokyo (JP)

(72) Inventors: Vittorio Loreto, Tokyo (JP); Pietro Gravino, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 370 days.

(21) Appl. No.: 17/535,685

(22) Filed: Nov. 26, 2021

(65) Prior Publication Data

US 2022/0180045 A1  Jun. 9, 2022

(30) Foreign Application Priority Data

Dec. 4, 2020 (EP) .................... 20211998

(51) Int. Cl.
| | |
|---|---|
| *G06F 17/00* | (2019.01) |
| *G06F 3/0482* | (2013.01) |
| *G06F 16/21* | (2019.01) |
| *G06F 40/166* | (2020.01) |

(52) U.S. Cl.
CPC .......... *G06F 40/166* (2020.01); *G06F 3/0482* (2013.01); *G06F 16/219* (2019.01); *G06F 2203/04803* (2013.01)

(58) Field of Classification Search
CPC ......... G06F 3/0482; G06F 2203/04803; G06F 16/10; G06F 16/30; G06F 16/20; G06F 16/219; G06F 16/2228; G06F 16/23; G06F 16/41; G06F 40/10; G06F 40/166; G06F 40/12; G06F 40/134; G06F 40/137; G06F 40/123; G06F 40/237; G06F 40/284; G06F 40/279

See application file for complete search history.

(56) References Cited

U.S. PATENT DOCUMENTS

| | | | |
|---|---|---|---|
| 8,775,385 B2 | 7/2014 | Rajabi et al. | |
| 2011/0055686 A1 | 3/2011 | Wason | |
| 2014/0019865 A1 | 1/2014 | Shah | |
| 2015/0356057 A1* | 12/2015 | Subramanian | G16H 15/00 704/9 |
| 2017/0193174 A1* | 7/2017 | Allen | G06F 40/279 |
| 2017/0221240 A1* | 8/2017 | Stetson | G06F 16/9024 |
| 2020/0175099 A1* | 6/2020 | Ono | G06F 3/0482 |

FOREIGN PATENT DOCUMENTS

CN  102541878 A  7/2012

OTHER PUBLICATIONS

Linder., "Editing Passages", Twine Wiki, Oct. 9, 2017, 1 page.

(Continued)

*Primary Examiner* — Michael Ortiz-Sanchez
(74) *Attorney, Agent, or Firm* — XSENSUS LLP

(57) ABSTRACT

Text editing apparatus comprises a database memory configured to store a text database, in which the text database is configured to store a plurality of text portions and a set of links between text portions, the set of links defining a document as a linked list of the text portions; and a data processor configured, in response to user input, to perform an editing operation to edit the text database so as to define an edited document by changing at least one of: (i) text within a text portion and (ii) the set of links between text portions.

20 Claims, 9 Drawing Sheets

(56) References Cited

OTHER PUBLICATIONS

Linder., "How to Review Your Story", Twine Wiki, Oct. 9, 2017, 1 page.
Linder., "How to Create Links", Twine Wiki, Oct. 9, 2017, 1 page.
Chang et al., "On Computer Supported Collaborative Writing Tools for Distributed Environments", Available Online at: http://citeseerx.ist.psu.edu/viewdoc/download?doi=10.1.1.26.2849&rep=rep1&type=pdf, Nov. 1994, 21 pages.

* cited by examiner

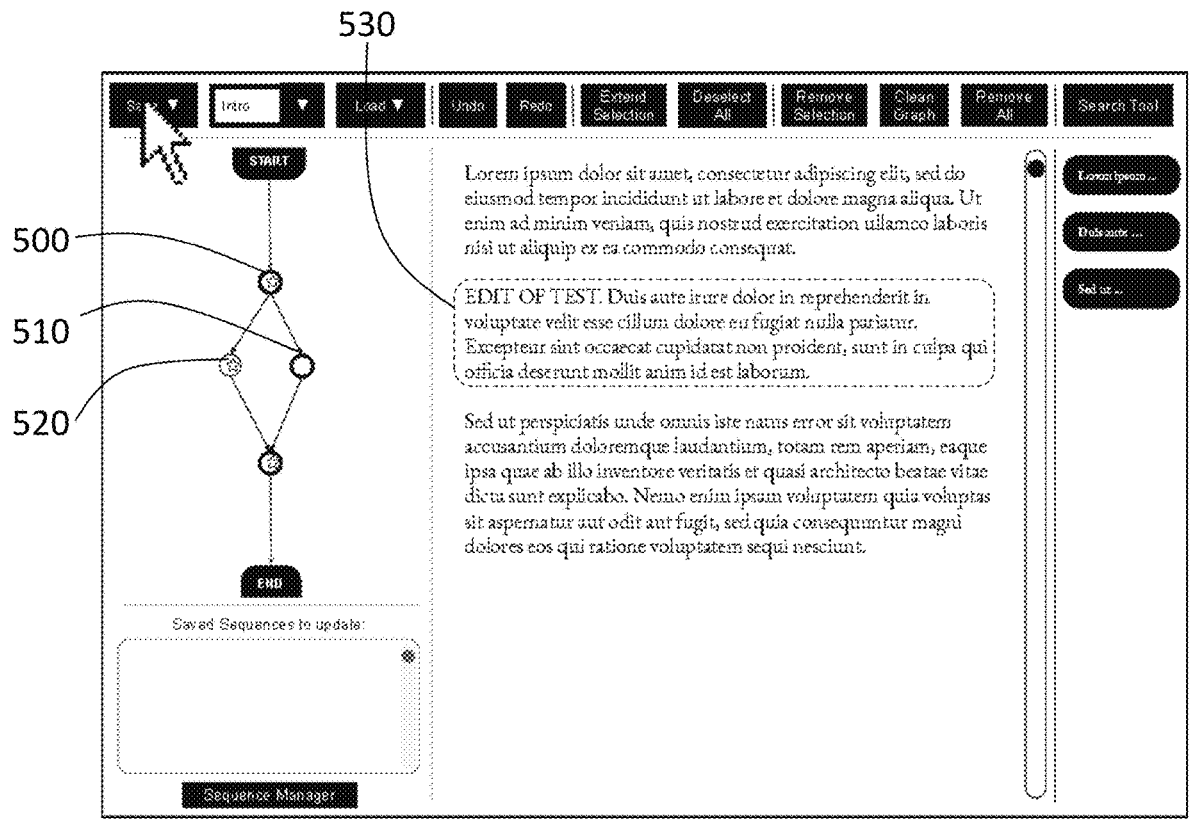
Fig. 5a
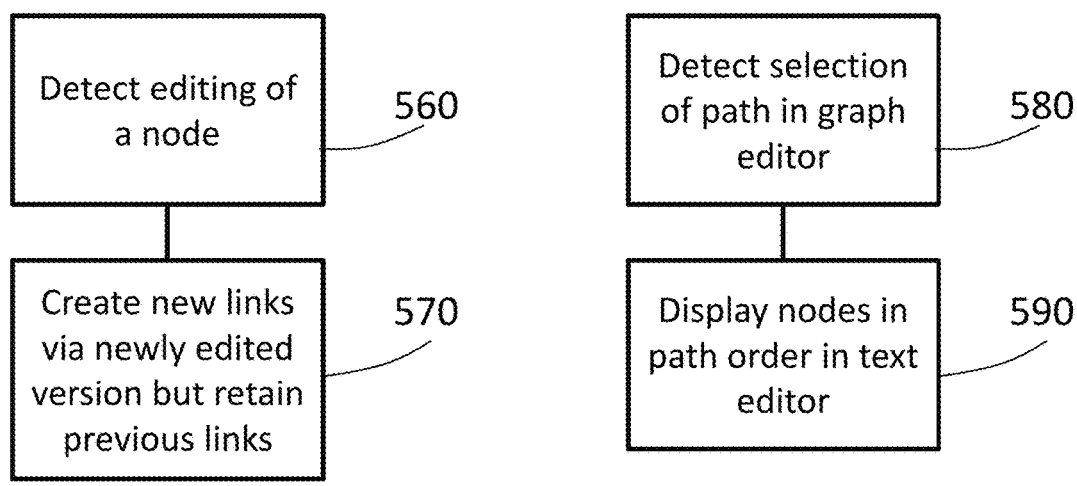
Fig. 5b
Fig. 5c

TEXT EDITING

CROSS-REFERENCE TO RELATED APPLICATION

The present application claims priority to European Patent Application No. 20211998.8 filed in the European Patent Office on Dec. 4, 2020, the entire contents of which are incorporated herein by reference.

BACKGROUND

Field

This disclosure relates to apparatus and methods for text editing.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

In the field of text editing, so-called word processors allow a user to enter and/or alter (collectively referred to here as "edit") a text document. A user interface arrangement is generally provided by such a word processor to allow the insertion, deletion or alteration of individual words or characters at selectable locations within a given individual text document. The resulting text is linear in nature, progressing from a document start to a document end.

SUMMARY

The present disclosure addresses or mitigates problems arising from this processing.

The present disclosure provides text editing apparatus comprising:
  a database memory configured to store a text database, in which, the text database is configured to store a plurality of text portions and a set of links between text portions, the set of links defining a document as a linked list of the text portions; and
  a data processor configured, in response to user input, to perform an editing operation to edit the text database so as to define an edited document by changing at least one of: (i) text within a text portion and (ii) the set of links between text portions.

The present disclosure also provides a method comprising:
  storing, by a database memory, a text database, comprising storing a plurality of text portions and a set of links between text portions, the set of links defining a document as a linked list of the text portions; and
  editing, by a data processor, the text database so as to define an edited document by changing at least one of:
    (i) text within a text portion and (ii) the set of links between text portions in response to user input.

The present disclosure also provides computer software which, when executed by a computer, causes the computer to perform such a method.

The present disclosure also provides a non-transitory machine-readable storage medium which stores such computer software.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5a schematically illustrates a user interface screen display;

FIGS. 5b and 5c are schematic flowcharts illustrating respective methods;

DESCRIPTION OF THE PREFERRED EMBODIMENTS

Overview of Apparatus

Figure 1:
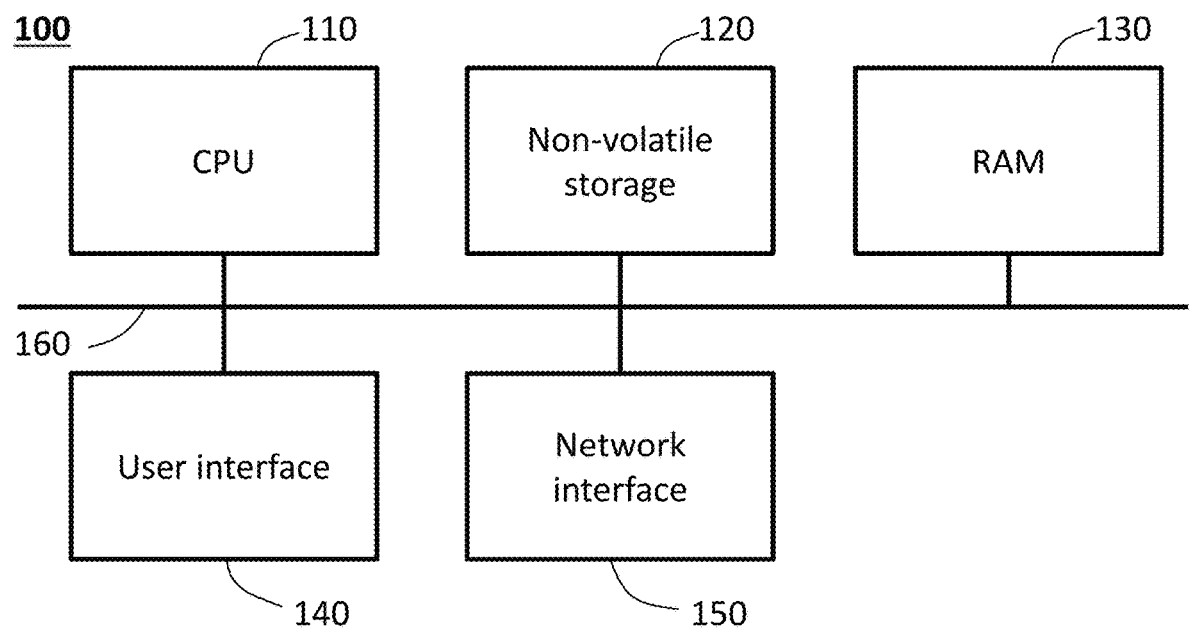
FIG. 1 schematically illustrates a data processing apparatus.

Referring now to the drawings, FIG. 1 schematically illustrates a data processing apparatus 100 which, under the control of appropriate computer software, is configured to perform the various aspects of functionality to be described below. The data processing apparatus 100 comprises a central processing unit (CPU) 110; non-volatile storage 120, such as magnetic or optical disk storage, a solid-state drive (SSD), flash memory or the like; random access memory (RAM) 130; user interface (UI) circuitry 140; and network interface circuitry 150, all interconnected by a bus structure 160.

The non-volatile storage 120 provide an example of machine-readable non-volatile storage configured to store computer software by which the apparatus 100 is controlled. Computer software may be provided to the apparatus 100 via the network interface 150 and output information generated by the apparatus 100 may be provided to other external apparatus or circuitries (not shown) by the network interface 150.

In operation, the CPU 110 executes instructions of computer software stored by the non-volatile storage 120 and, where appropriate, temporarily stored by the RAM 130. The instructions may relate to displaying information to a user and/or receiving input from the user via the UI circuitry 140, and/or effecting modifications to a text database stored by the RAM 130 and/or the non-volatile storage 120. In some examples to be discussed below, these two aspects of functionality may be performed by separate processors or indeed separate data processing apparatus, but in other examples these two aspects of functionality may be performed by the apparatus of FIG. 1, for example as respective threads, processes or programs executed by the CPU 110.

It will be appreciated that the arrangement shown in FIG. 1 is a schematic one for the purposes of the present description and that, in a particular working embodiment, other circuitry may be provided. For example, more than one CPU 110 may be used.

Figure 2:
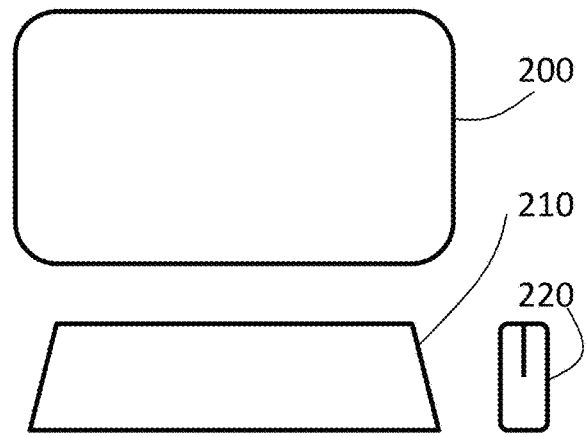
FIG. 2 schematically illustrates user interface apparatus.

Referring to FIG. 2, an example arrangement which may be connected to the apparatus of FIG. 1 via the UI circuitry 140 is shown, comprising (for the purposes of the present description) a display screen 200, a keyboard 210 and a mouse control 220. Information generated by the CPU 110 executing the computer software discussed above may be displayed to the user via the display screen 200, and input may be received from the user via the keyboard 210 and/or the mouse 220. It will be appreciated that these are just examples and other information output devices and/or user control input devices may be used as well or instead.

Text Editing Functionality—Overview

In example embodiments, the apparatus 100 (or variations of it to be discussed below) are configured to operate as text editing apparatus. In such an arrangement, a database memory such as the RAM 130 and/or the non-volatile storage 120 acts to store a text database and the CPU 110 operates as a data processor configured, in response to user input (for example via the UI circuitry 140) to edit the text database.

Further details of the text editing functionality will be discussed below. In general, however, a novel type of text editor is provided, recognising that in real life, the creation of a document often does not itself start from the beginning of the document and progress linearly to the end of the document. Instead, document creation can be a non-linear process with some degree of this orderliness and jumping around editions within the document while various options for wording are tried out. The present arrangement aims to provide a text editing function which allows users to more easily develop non-linear texts, to provide users with features to facilitate editing operations such as block swapping, version comparisons and the like, to allow text from different sources such as different users to be included and to facilitate the appropriate attribution of such text.

Figure 3:
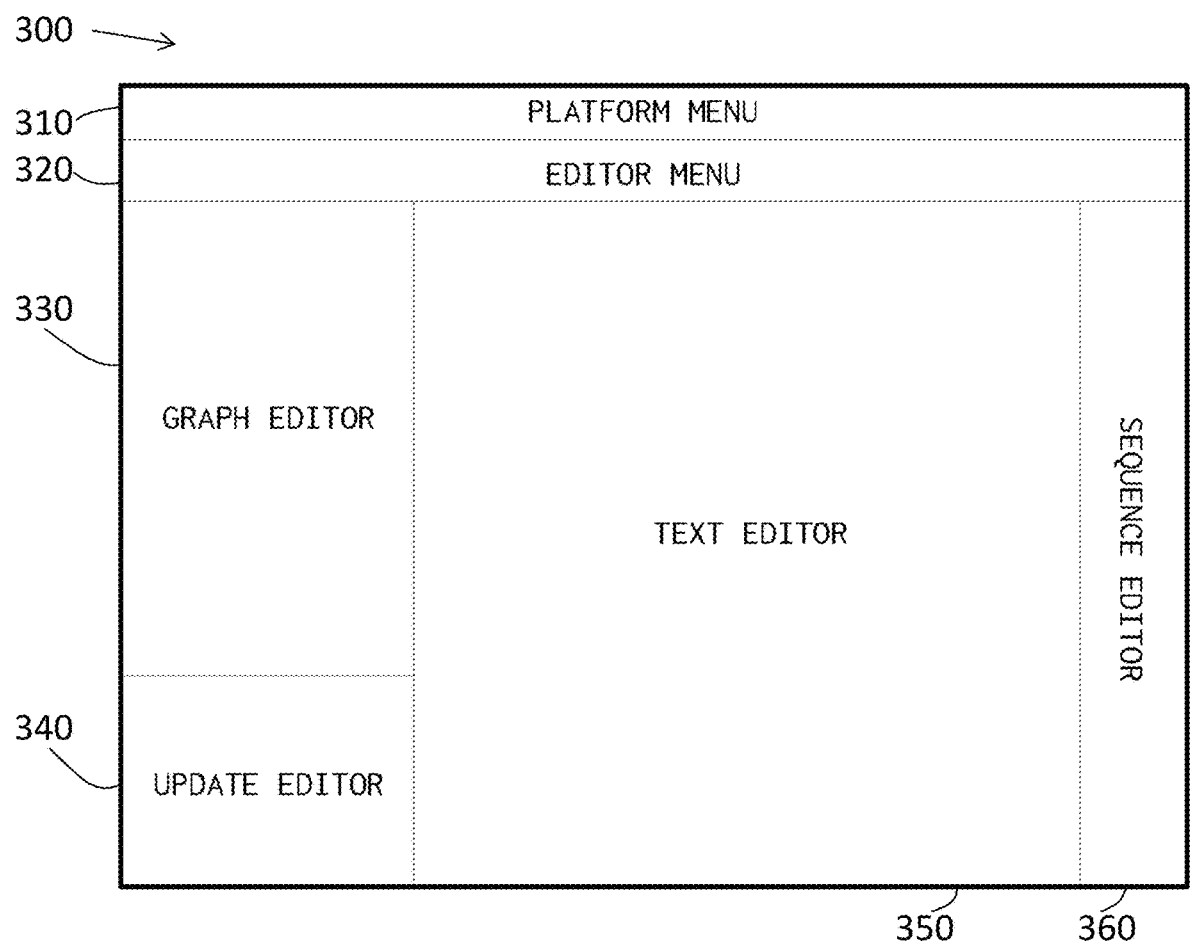
FIGS. 3 and 4a schematically illustrate respective user interface screen displays.

A basic screen layout 300, for example for display by the display screen 200, is illustrated schematically in FIG. 3. At the top of the layout 300 in this example is a so-called platform menu 310, representing menu items and/or window controls appropriate to the operating system (such as macOS® provided by Apple Inc.®, Windows® provided by Microsoft®, or a distribution of the Linux® operating system). In the diagrams which follow, the platform menu will not be displayed, for clarity of the discussion.

Beneath the platform menu is an editor menu 320 providing commands and/or menu items appropriate to the text editing functionality to be discussed here. Example operations provided by the editor menu 320 (and as shown in diagrams to be discussed below) may include file operations (save, load or the like) menu selection operations, text selecting operations deletion operations or the like.

In a main screen area, a graph editor 330, an update editor 340, a text editor 350 and a sequence editor 360 are provided as respective display regions. The user may perform an operation with respect to any one of the platform menu 310, the editor menu 320 or the editors 330 . . . 360 by selecting the appropriate screen location using, for example, the mouse 220 and, where necessary, typing information into the keyboard 210.

Many of the interface functions of the present embodiment make use of the graph editor, the sequence editor and the text editor.

The text editor provides a visualisation of textual content of a currently selected sequence or path and allows the user to edit that text. Whenever text is edited or input the text is passed by the CPU 110 and separated according to the separator character, string or code. Each text portion with its separator contributes to the structure of the graph or linked list, for example being a linked acyclic list. ("Acyclic" in this context implies that the list does not form part of a cyclic or circular list). A portion of text along with its separator forms a node and the relationship between adjacent nodes is represented by links (otherwise referred to as "directional edges" between them. Any changes made in the text editor screen (or indeed any changes made in any of the screen regions) are automatically propagated to the other editors. In examples, therefore, the data processor is configured to generate a user interface display comprising representations of at least some of the text portions and to be responsive to user input to select a text portion for editing from those text portions for which representations are displayed.

The graph editor visualises the graph or links between nodes and allows the user to create new nodes, new links or edges and to select sequences.

The sequence editor visualises the sequence of notes currently selected, allowing the position of nodes to be switched.

A main or current sequence is a particular saved sequence running from the start nodes to the end node and allows the user to have something on display which represents a version of their work as close as possible to the desired end result. The main sequence is graphically highlighted in the graph editor. Characteristics of the main sequence include that during the entire lifetime of a project, there is always one and only one main sequence unless the graph is entirely empty; a main sequence is created automatically with the creation of the first node of the project and always starts from the start node and ends at the end node. It cannot be broken; if a node is removed then links will be reinstated to provide a continuous main sequence. In other words, as part of an editing operation and in response to user input: the data processor is configured to perform deletion of a given text portion, the given text portion being linked by respective links to a preceding text portion in the acyclic linked list and to a subsequent text portion in the acyclic linked list; and the data processor is configured, in response to the deletion of the given portion, to automatically generate a link form the preceding text portion to the subsequent text portion.

Nodes (Text Portions) and Links

Figure 4A:
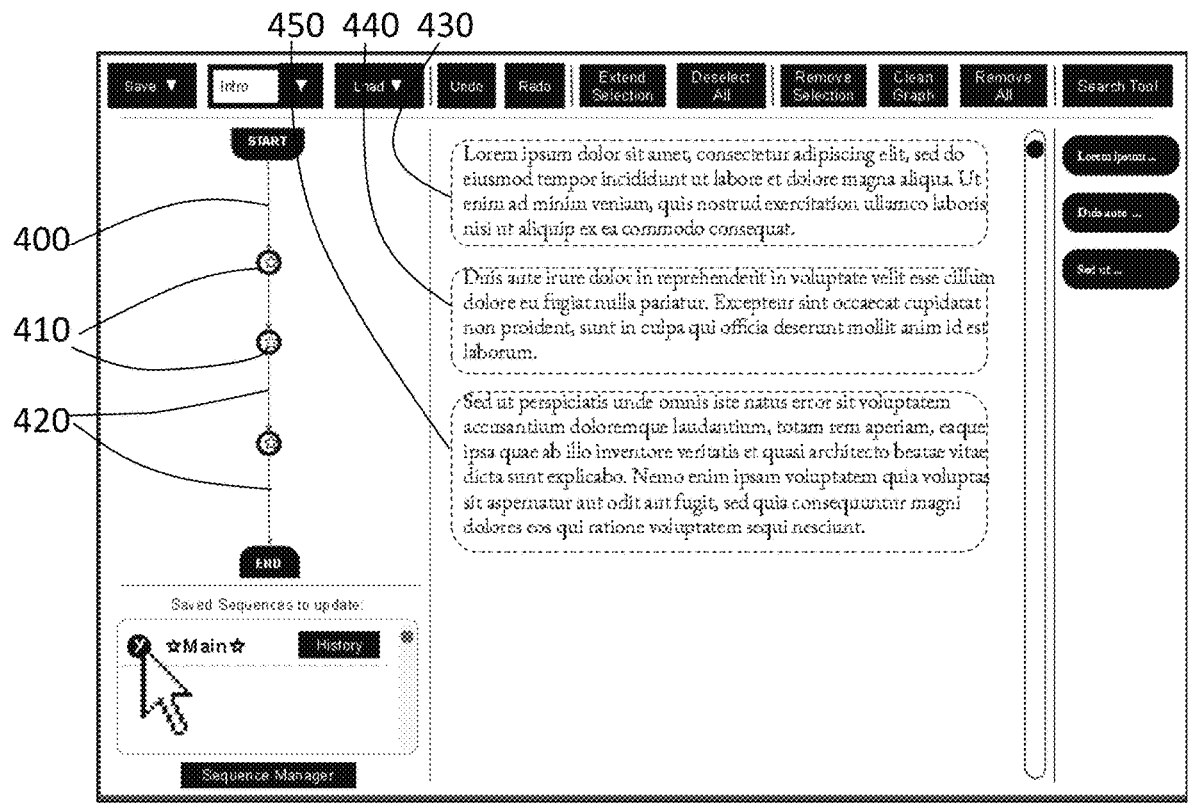

The concept of nodes (otherwise referred to here as text portions) and links will be discussed with reference to FIGS. 4*a* and 4*b*. FIG. 4*a* schematically represents a populated example of the display screen format of FIG. 3, though without the platform menu being shown.

A node is a fragment of text representing a basic unit of the editing arrangement. It could be a sentence or paragraph or another unit, depending on the kind of text and on a node separator selected by the user, for example when first creating a work project. The separator could be a single character or a sequence of characters, or even a tag to represent (for example) carriage return. A node generally contains a non-zero amount of text. There are two special notes: the starts node and the end node. These contain no content and simply mark the beginning and the end of the overall document. The start and end nodes are shown schematically in the graph editor region of FIG. 4a.

A simplified example document is illustrated in FIG. 4a, comprising three nodes 430, 440, 450 each containing a respective portion of text. Note that the character(s) detected as the node separator are not displayed in the text editor portion of FIG. 4a, and the broken lines around the nodes are for clarity of the diagram and need not necessarily be displayed. Each such node is represented by a respective node icon 410, with the node icon is being linked in the graph editor by schematic links 400, 420, forming a linked list such as an acyclic linked list between the start node and the end node, the linked list comprising the nodes 430, 440, 450 in that order. At the stage displayed schematically in FIG. 4a, no updates have been made and so the update editor region 340 is unpopulated. The sequence editor region 360 contains so-called thumbnails (heavily abbreviated versions) of each of the nodes 430 . . . 450.

The structure of nodes and links is reflected in an underlying text database stored by the database memory discussed above, in which the text database is configured to store a plurality of the text portions or nodes and a set of links between text portions, the set of links defining a document as a linked list such as an acyclic linked list of the text portions. Using the display screen format of FIG. 3 and user input via the UI circuitry 140, the CPU 110 acts as a data processor configured, in response to user input, to perform an editing operation to edit the text database so as to define an edited document by changing at least one of: (i) text within a text portion and (ii) the set of links between text portions. Such editing operations will be described below with reference to further examples of display screens provided to the user.

Figure 4B:
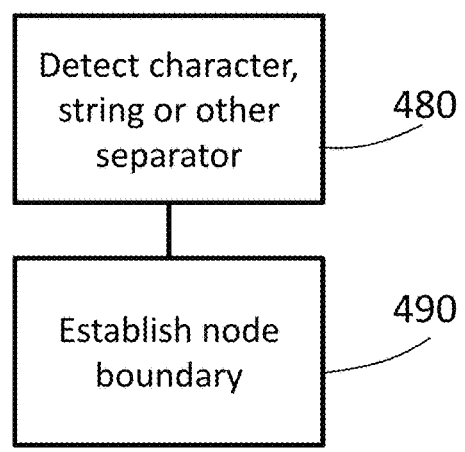
FIG. 4b is a schematic flowchart illustrating a method.

FIG. 4b is a schematic flowchart illustrating the separation of text as input into the editing system into nodes, in which, at a step 480, the CPU 110 detects a character, string or other separator indicative of a separation between nodes (and established, for example, by user input upon starting the text editor functionality). At a step 490, the CPU 110 establishes a node boundary and stores text input before the detected separator as one node and text input after the detected separator as another node in the text database. As a default, when a node boundary is established, a link is established in the text database between the node preceding the newly detected node boundary and the node following the newly detected node boundary.

This provides an example in which the data processor is configured, in response to user text input, to detect a boundary between text portions in response to a detection by the data processor of one or more user-defined separator characters within the user text input.

Nodes can be annotated, for example by a brief string of text. This can be useful, for example, to comment on the content of the node making the node easier to find later, for example using a search function. Annotations may follow the visibility rules of the nodes to which they belong.

Multiple Paths

FIG. 5a schematically illustrates the effect of an editing operation upon one or more of the nodes such as an example node 530. When an editing operation is performed upon a node, the previous version of the node is retained along with its links, but the new version is also retained in its place along with links to nodes to which the previous version was already connected. This arrangement is shown schematically in the graph editor of FIG. 5a, in which the node preceding the edited node (a node 500) is represented at which point the paths diverged or bifurcate. A current path (formed of successive links) is shown to the new (edited) version 510 of the node 530 and a previous path is shown passing through the previous version 520 of the node 530. As discussed below, the previous path and the previous version 520 can be selected as an editing operation.

Therefore, in examples, the data processor is configured, as part of the editing operation, to maintain one or more previous versions of the text portions and one or more previous version of the set of links.

FIG. 5b is a schematic flowchart illustrating this arrangement in which, at a step 560, the CPU 110 detects the editing of a node or text portion such as the node 530 described above. At a step 570, the CPU 110 amends the text database so as to create a new path via the newly edited version while retaining the previous path.

The user can select, for example by clicking using the mouse 220 on the path via the node 520 or the path via the node 510 either of the paths discussed above. Similarly, the user can select either the node 510 or the node 520 by clicking on the graph editor, and in response to such a selection the appropriate path (comprising links by the selected node will become the currently active path and the selected node will be displayed, for example as the node 530, in the text editor. This process is summarised in FIG. 5C which is a schematic flowchart illustrating such a method, comprising, at a step 580, the CPU 110 detecting the selection of a path in the graph editor and, at a step 590, the CPU 110 displaying the nodes passing through that path in a path order in the text editor.

Figure 6A:
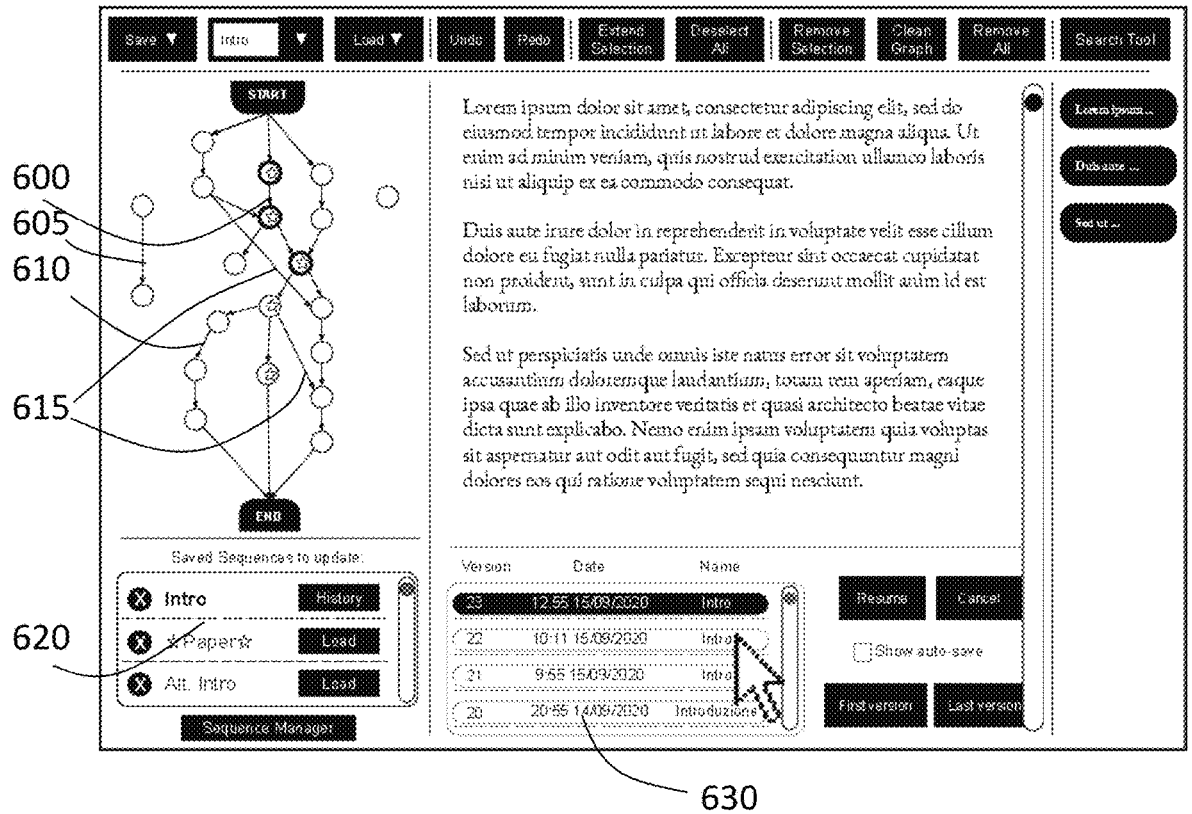
FIG. 6a schematically illustrates a user interface screen display.

Continuing the discussion of multiple paths, FIG. 6a schematically illustrates a more complicated arrangement of paths and previous paths, in which a main or active path 600 formed by links between successive nodes is displayed, along with multiple versions of other paths 610 in the graph editor. Each of these paths may be given a respective label by the user and is selectable according to those labels by the update editor region 620.

FIG. 6a also schematically illustrates an optional portion 630 of the display screen which may list previously implemented versions of the document. For example, these may be versions saved at time intervals by the CPU 110, for example every 10 minutes, versions saved after a particular number of characters or control operations, versions saved manually by the user or the like. By selecting a version the user may revert to a previously saved arrangement of the text database without discarding the latest version (in that the latest version is retained but not displayed as the currently active version). Therefore, in examples, the data processor is configured, as part of the editing operation, to select a previous version of a given text portion to replace a current version of the given text portion. In a similar way, in examples, the data processor is configured, as part of the editing operation, to select a previous version of a given link between text portions.

Another optional feature shown schematically in FIG. 6a is the use of cyclic paths, for example paths formed in part by links 615. In some embodiments, cyclic paths can be allowed, though not in a saved sequence (which can be acyclic in example embodiments). In other example embodiments, the paths can be restricted to only allowing acyclic paths. at any point in the graph and at any stage in preparation of the document.

Note that FIG. 6a also shows an isolated disconnected path 605 linking nodes which are not linked to the remaining nodes. In the example shown these do not form part of the document or saved sequence.

Figure 6B:
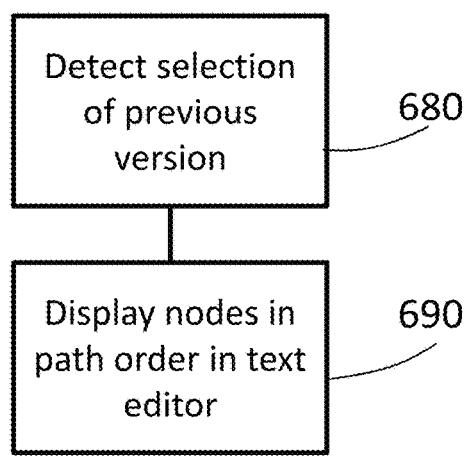
FIG. 6b is a schematic flowchart illustrating a method.

Referring to FIG. 6b, at a step 680, the CPU 110 detects the selection of a previous version and at a step 690 causes the display of nodes appropriate to that previous version in the path order appropriate to that previous version in the text editor.

Amendment of Links

Figure 7A:
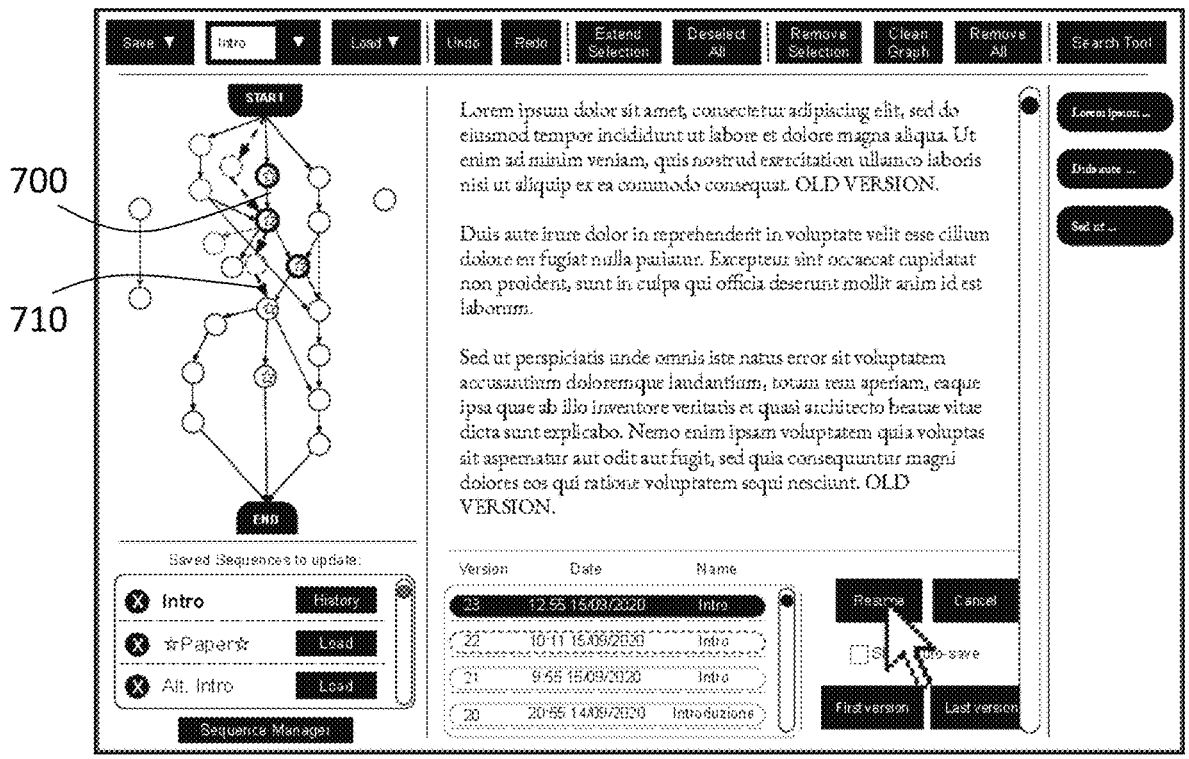
FIG. 7a schematically illustrates a user interface screen display.

In the discussion so far, alterations have been made to text contained in nodes or text portions, but with reference to FIG. 7a, the alteration of the links between nodes will also be discussed.

Amendment of links along with other actions may be undertaken in the graph editor as discussed above. In general terms, within the graph editor, the user can undertake various example actions:

Hover over a node: causes the text content to be shown temporarily;
Select one or more nodes by left click for example;
Deselect in current selection by left click or right click;
Deselect all;
Create a new node;
Create a new link, for example by dragging a "hook" from one node to another node; Remove a single node (for example by a right click);
Remove a link;
Clean the graph, hiding all nodes and links not included in a saved sequence;
Remove all, hiding all the visible links and nodes and removing all save sequences (note that any entity in the graph editor may currently be classified as "visible" or "hidden", either manually or automatically);
Insert a selection in place of a link;
Open the sequence manager 630; or
Remove multiple nodes and/or multiple links.

Therefore, in examples, the data processor is configured to be responsive to user input to establish a link between text portions for which representations are displayed. Similarly, the data processor is configured to generate a user interface display comprising representations of at least some of the set of links and to be responsive to user input to select a link for editing from those links for which representations are displayed.

With reference to FIG. 7a, the main sequence 700 and another sequence 710. If the user deletes a node in the main sequence, nodes before and after the deleted node are linked by a newly formed link automatically. If the user switches from a main sequence 700 to the other sequence 710, the node is displayed in the text editor automatically updates to the nodes within the other sequence 710 (which is now of course the main sequence).

Figure 7B:
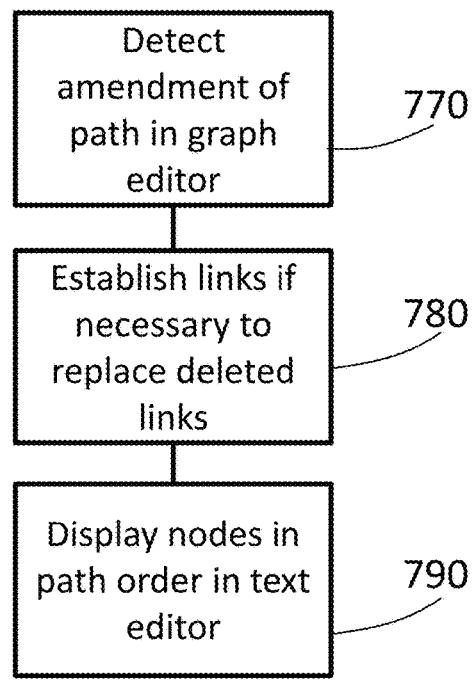
FIG. 7b is a schematic flowchart illustrating a method.

Referring to FIG. 7b, at a step 770 the CPU detects the amendment of a path formed of links in the graph editor. At a step 780, the CPU establishes links (if necessary) to replace any deleted links and at a step 790 the CPU displays the nodes in the path order in the text editor.

Front-End and Back-End Processors

As discussed above, the apparatus of FIG. 1 may instead be implemented as so-called "front-end" and "back-end" processors. Note that in some examples, the front-end processor may perform at least a part of its functionality by executing so-called browser software to access the back-end processor executing (at least in part) server functionality. In some examples these respective aspects may be referred to as a web browser and a web server, although it will be appreciated that a technically significant feature is the nature of the interface between these processes, and not that the two portions need to be connected by a web or internet connection; in many embodiments they will be directly connected without such a web connection.

Figure 8:
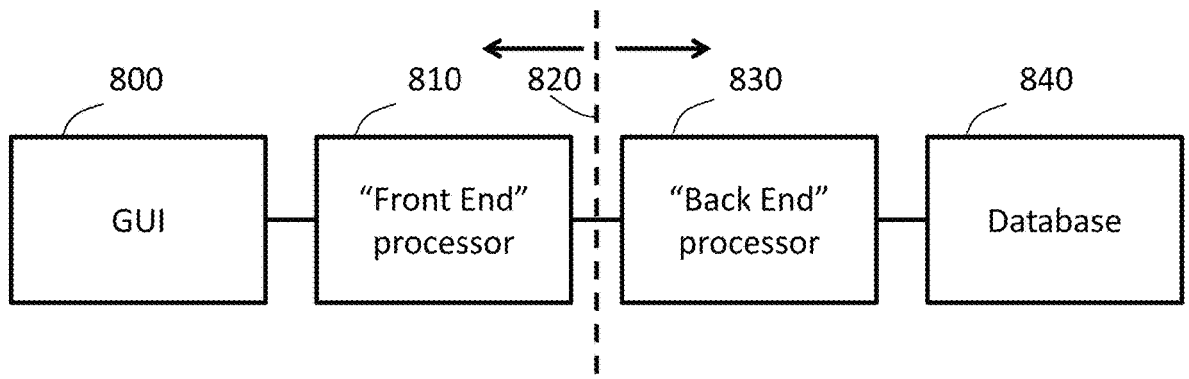
FIG. 8 schematically illustrates example operations of the data processing apparatus of FIG. 1.

An example is shown schematically in FIG. 8 in which the front-end processor 810 (to the left of a notional division 820) has responsibility for interactions with the user via a graphical user interface 800, whereas the back-end processor 830 has responsibility for managing the text database 840.

Figure 9:
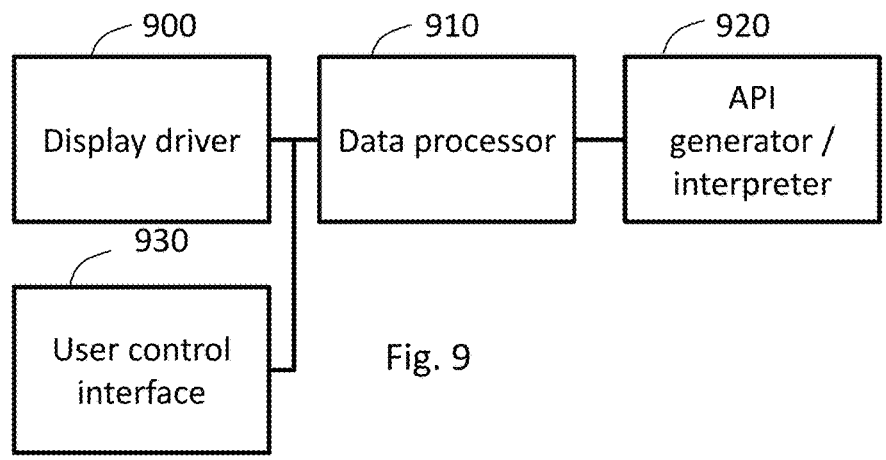
FIG. 9 schematically illustrates a so-called front-end processor.

FIG. 9 schematically illustrates a possible configuration of the front-end processor 810, comprising a data processor 910 such as a CPU similar to the CPU 110, a display driver 900 to generate output signals for display, a user control Interface 930 to receive input control signals from the user, and an application programming interface (API) generator/interpreter 920 to provide API signals to the back-end processor 830 and to receive such signals from the back-end processor.

Figure 10:
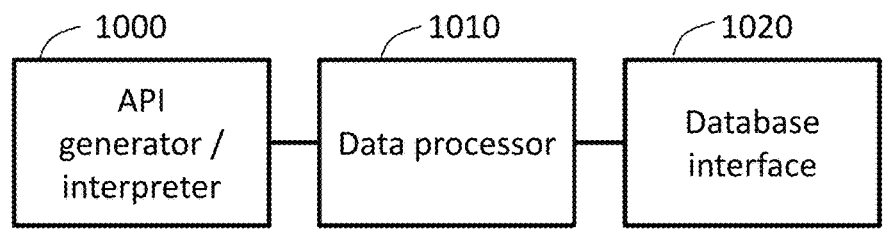
FIG. 10 schematically illustrates a so-called back-end processor.

FIG. 10 schematically illustrates an example of the back-end processor 830 comprising an API generator/interpreter 1000 for communication with the front-end processor 810, a data processor 1010 similar for example to the CPU 110 and a database interface 1020.

Example Database Structure

In example arrangements the text database 840 is a structured query language (SQL) database and the data processor is configured to perform the editing operation, in part, by the data processor 1010 and/or the database interface 1020 generating one or more SQL operations to control the text database.

Figure 11:
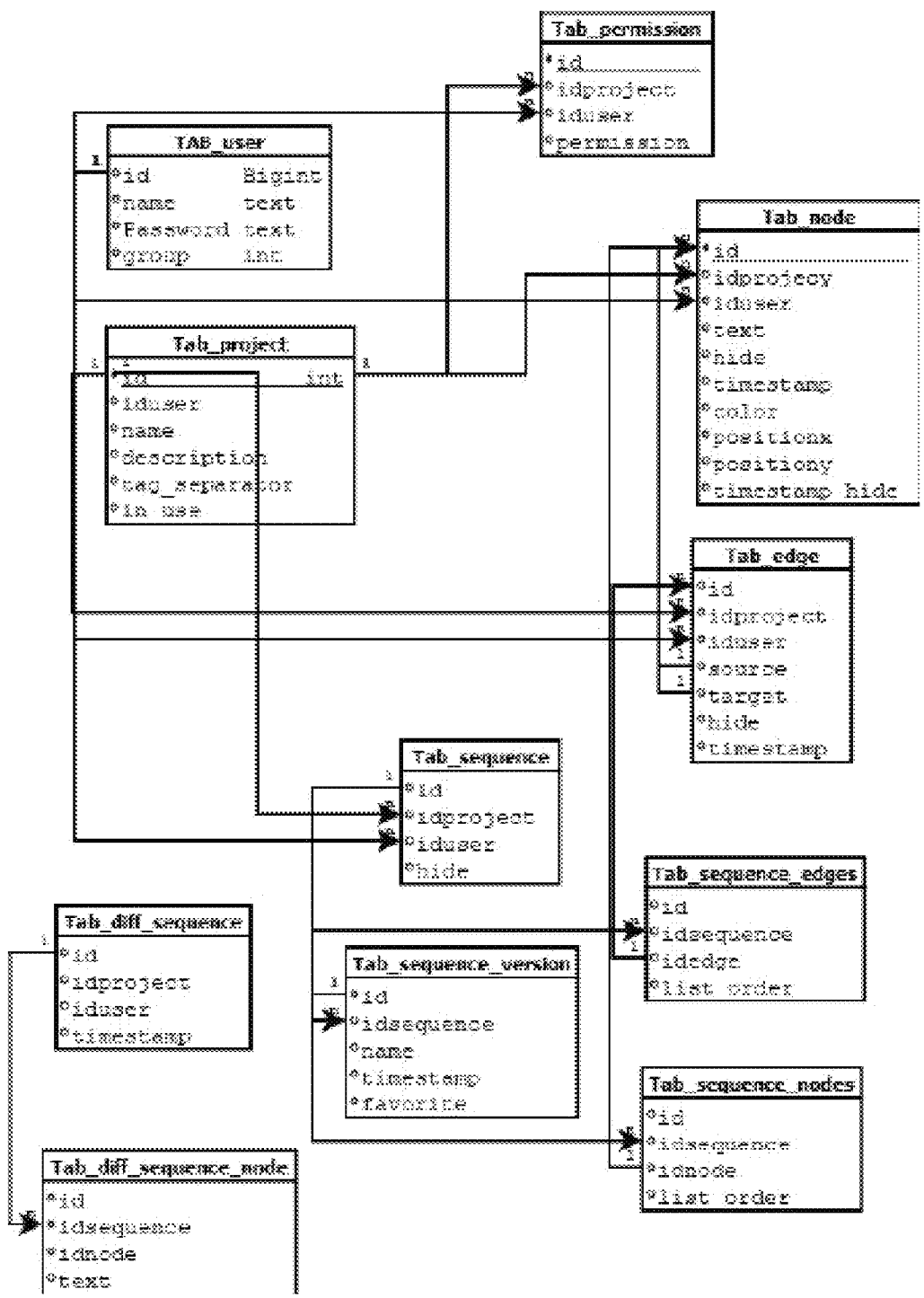
FIG. 11 schematically illustrates an example database structure.

A schematic example of aspects of the database structure is shown in FIG. 11 in which multiple so-called "tabs" are linked together in a hierarchical manner, for example covering matters such as user identification, project identification, sequences, edges and nodes, each with respective identifiers ("id") and linkages within the text database structure.

Attribution

It is possible for multiple users to edit one or more projects, for example one user at a time. The CPU 110 or the data processor 910 can record, for example using a block chain mechanism, each edit operation and its author. In this way, contributions to the generation of a document can be recorded and attribute it in a trusted way. For example, the system may create a JavaScript object notation (JSON) object or file periodically, for example every n saves (where n may be 3 for example) containing authentication keys for recognition by the block chain API, a timestamp and data about authors and edits made during the time passed between successive JSON updates. These data may be sent to a block chain API which manages the requests and stores the data in an Ethereum block chain arrangement.

Summary Method

Figure 12:
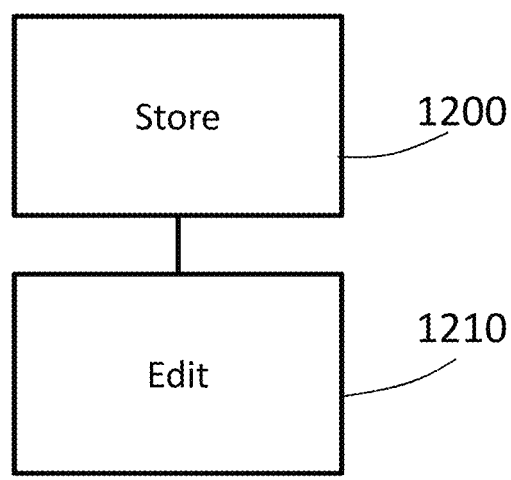
FIG. 12 is a schematic flowchart illustrating a method.

FIG. 12 is a schematic flowchart illustrating a method comprising:

storing (at a step 1200), by a database memory, a text database, comprising storing a plurality of text portions and a set of links between text portions, the set of links defining a document as a linked list such as an acyclic linked list of the text portions; and editing (at a step 1210), by a data processor, the text database so as to define an edited document by changing at least one of: (i) text within a text portion and (ii) the set of links between text portions in response to user input.

The method of FIG. 12 may be performed by the apparatus of FIGS. 1, 2 and 8-10 as appropriate.

Summary

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. Text editing apparatus comprising:
    a database memory configured to store a text database, in which the text database is configured to store a plurality of text portions and a set of links between text portions, the set of links defining a document as a linked list of the text portions; and
    a data processor configured, in response to user input, to perform an editing operation to edit the text database so as to define an edited document by changing at least one of: (i) text within a text portion and (ii) the set of links between text portions.

2. The text editing apparatus of clause 1, in which the data processor is configured, as part of the editing operation, to maintain one or more previous versions of the text portions and one or more previous version of the set of links.

3. The text editing apparatus of clause 2, in which the data processor is configured, as part of the editing operation, to select a previous version of a given text portion to replace a current version of the given text portion.

4. The text editing apparatus of clause 2 or clause 3, in which the data processor is configured, as part of the editing operation, to select a previous version of a given link between text portions.

5. The text editing apparatus of any one of the preceding clauses, in which the data processor is configured, in response to user text input, to detect a boundary between text portions in response to a detection by the data processor of one or more user-defined separator characters within the user text input.

6. The text editing apparatus of any one of the preceding clauses, in which the data processor is configured to generate a user interface display comprising representations of at least some of the text portions and to be responsive to user input to select a text portion for editing from those text portions for which representations are displayed.

7. The text editing apparatus of clause 6, in which the data processor is configured to be responsive to user input to establish a link between text portions for which representations are displayed.

8. The text editing apparatus of any one of the preceding clauses, in which the data processor is configured to generate a user interface display comprising representations of at least some of the set of links and to be responsive to user input to select a link for editing from those links for which representations are displayed.

9. The text editing apparatus of any one of the preceding clauses, in which, as part of an editing operation and in response to user input:
    the data processor is configured to perform deletion of a given text portion, the given text portion being linked by respective links to a preceding text portion in the linked list and to a subsequent text portion in the linked list; and
    the data processor is configured, in response to the deletion of the given portion, to automatically generate a link form the preceding text portion to the subsequent text portion.

10. The text editing apparatus of any one of the preceding clauses, in which the text database is a structured query language (SQL) database and the data processor is configured to perform the editing operation, in part, by generating one or more SQL operations to control the text database.

11. The text editing apparatus of any one of the preceding clauses, in which the linked list is an acyclic linked list.

12. A method comprising:
    storing, by a database memory, a text database, comprising storing a plurality of text portions and a set of links between text portions, the set of links defining a document as a linked list of the text portions; and editing, by a data processor, the text database so as to define an edited document by changing at least one of: (i) text within a text portion and (ii) the set of links between text portions in response to user input.

13. Computer software which, when executed by a computer, causes the computer to perform the method of clause 12.

14. A non-transitory machine-readable storage medium which stores the computer software of clause 13.

The invention claimed is:

1. A text editing apparatus comprising:
a database memory configured to store a text database, in which the text database is configured to store a plurality of text portions and a set of links between the plurality of text portions, the set of links defining a document as a linked list of the plurality of text portions;
a user interface configured to:
  display the plurality of text portions in a text editor of the user interface,
  display a plurality of node icons, each node icon representing a respective one of the plurality of text portions, the plurality of node icons being displayed in a graph editor of the user interface, and
  display the set of links in the graph editor of the user interface, the set of links being connected to the plurality of node icons, and
a data processor configured, in response to user input, to perform an editing operation to edit the text database so as to define an edited document by changing (i) text within a respective one of the plurality of text portions and (ii) the set of links between the plurality of text portions by creating a new link to an edited node icon while maintaining a previous link, such that one of the plurality of node icons preceding the edited node icon is represented at which point a path of the linked list diverges,
wherein the set of links are ordered in accordance with an order of the document.

2. The text editing apparatus of claim 1, in which the data processor is configured, as part of the editing operation, to maintain one or more previous versions of the plurality of text portions and one or more previous versions of the set of links.

3. The text editing apparatus of claim 2, in which the data processor is configured, as part of the editing operation, to select a previous version of a given text portion among the plurality of text portions to replace a current version of the given text portion.

4. The text editing apparatus of claim 2, in which the data processor is configured, as part of the editing operation, to select a previous version of a given link among the set of links between the plurality of text portions.

5. The text editing apparatus of claim 1, in which the data processor is configured, in response to user text input, to detect a boundary between the plurality of text portions in response to a detection by the data processor of one or more user-defined separator characters within the user text input.

6. The text editing apparatus of claim 1, in which the data processor is configured to generate the user interface display comprising representations of at least some of the text portions and to be responsive to user input to select a text portion for editing from the at least some of the text portions for which representations are displayed.

7. The text editing apparatus of claim 6, in which the data processor is configured to be responsive to the user input to establish a link between text portions for which representations are displayed.

8. The text editing apparatus of claim 1, in which the data processor is configured to generate the user interface display comprising representations of at least some of the set of links and to be responsive to the user input to select a link for editing from at least some of the set of links for which representations are displayed.

9. The text editing apparatus of claim 1, in which, as part of an editing operation and in response to the user input:
the data processor is configured to perform deletion of a given text portion among the plurality of text portions, the given text portion being linked by respective links to a preceding text portion in the linked list and to a subsequent text portion in the linked list; and
the data processor is configured, in response to the deletion of the given portion, to automatically generate a link form the preceding text portion to the subsequent text portion.

10. The text editing apparatus of claim 1, in which the text database is a structured query language (SQL) database and the data processor is configured to perform the editing operation, in part, by generating one or more SQL operations to control the text database.

11. The text editing apparatus of claim 1, in which the linked list is an acyclic linked list.

12. A method comprising:
storing, by a database memory, a text database, comprising storing a plurality of text portions and a set of links between the plurality of text portions, the set of links defining a document as a linked list of the plurality of text portions;
displaying, via a user interface, the plurality of text portions in a text editor of the user interface;
displaying, via the user interface, a plurality of node icons, each node icon representing a respective one of the plurality of text portions, the plurality of node icons being displayed in a graph editor of the user interface;
displaying, via the user interface, the set of links in the graph editor of the user interface, the set of links being connected to the plurality of node icons; and
editing, by a data processor, the text database so as to define an edited document by changing (i) text within a respective one of the plurality of text portions and (ii) the set of links between the plurality of text portions in response to user input portions by creating a new link to an edited node icon while maintaining a previous link, such that one of the plurality of node icons preceding the edited node icon is represented at which point a path of the linked list diverges,
wherein the set of links are ordered in accordance with an order of the document.

13. The method of claim 12, further comprising maintaining, by the data processor, as part of the editing, one or more previous versions of the plurality of text portions and one or more previous versions of the set of links.

14. The method of claim 13, further comprising selecting, by the data processor, as part of the editing, a previous version of a given text portion among the plurality of text portions to replace a current version of the given text portion.

15. The method of claim 13, further comprising selecting, by the data processor, as part of the editing, a previous version of a given link among the set of links between the plurality of text portions.

16. The method of claim 12, further comprising detecting, by the data processor, in response to user text input, a boundary between the plurality of text portions in response to a detection by the data processor of one or more user-defined separator characters within the user text input.

17. The method of claim 12, in which, as part of an editing operation and in response to user input:
    performing, by the data processor, deletion of a given text portion among the plurality of text portions, the given text portion being linked by respective links to a preceding text portion in the linked list and to a subsequent text portion in the linked list; and
    in response to the deletion of the given portion, automatically generating, by the data processor, a link form the preceding text portion to the subsequent text portion.

18. The method of claim 12, in which the text database is a structured query language (SQL) database and the data processor is configured to perform the editing operation, in part, by generating one or more SQL operations to control the text database.

19. The method of claim 12, in which the linked list is an acyclic linked list.

20. A non-transitory machine-readable storage medium comprising computer executable program code configured to instruct at least one computer to perform the steps of:
    storing a text database comprising storing a plurality of text portions and a set of links between the plurality of text portions, the set of links defining a document as a linked list of the plurality of text portions;
    displaying, on a user interface, the plurality of text portions in a text editor of the user interface;
    displaying, on the user interface, a plurality of node icons, each node icon representing a respective one of the plurality of text portions, the plurality of node icons being displayed in a graph editor of the user interface;
    displaying, on the user interface, the set of links in the graph editor of the user interface, the set of links being connected to the plurality of node icons; and
    editing the text database so as to define an edited document by changing (i) text within a respective one of the plurality of text portions and (ii) the set of links between the plurality of text portions in response to user input portions by creating a new link to an edited node icon while maintaining a previous link, such that one of the plurality of node icons preceding the edited node icon is represented at which point a path of the linked list diverges,
    wherein the set of links are ordered in accordance with an order of the document.

* * * * *